United States Patent
Akoulitchev et al.

(10) Patent No.: US 9,734,575 B2
(45) Date of Patent: Aug. 15, 2017

(54) METHOD FOR ASSESSING CELL AGING

(71) Applicant: CHRONOS THERAPEUTICS LIMITED, Oxford (GB)

(72) Inventors: Alexandre Akoulitchev, Oxford (GB); Joanne Hopper, Oxford (GB); Elizabeth Jane Mellor, Oxford (GB); Michael Youdell, Oxford (GB)

(*) Notice: Subject to any disclaimer, the term of this patent is extended or adjusted under 35 U.S.C. 154(b) by 0 days.

(21) Appl. No.: 14/761,970

(22) PCT Filed: Jan. 21, 2014

(86) PCT No.: PCT/GB2014/050154
§ 371 (c)(1),
(2) Date: Jul. 20, 2015

(87) PCT Pub. No.: WO2014/111732
PCT Pub. Date: Jul. 24, 2014

(65) Prior Publication Data
US 2015/0317795 A1    Nov. 5, 2015

(30) Foreign Application Priority Data
Jan. 21, 2013  (GB) .................................. 1301043.4

(51) Int. Cl.
*G06T 7/00* (2017.01)
*G02B 21/36* (2006.01)
(Continued)

(52) U.S. Cl.
CPC .......... *G06T 7/0012* (2013.01); *G02B 21/365* (2013.01); *G06K 9/00127* (2013.01);
(Continued)

(58) Field of Classification Search
CPC .............. G02B 21/365; G06K 9/00127; G06T 2207/10056; G06T 2207/30024; G06T 7/0012; G06T 7/2053
See application file for complete search history.

(56) References Cited

U.S. PATENT DOCUMENTS

| 5,789,242 A | 8/1998 | Portmann et al. |
| 8,265,357 B2 | 9/2012 | Ramsing et al. |

(Continued)

FOREIGN PATENT DOCUMENTS

| GB | 2479628 A | 10/2011 |
| WO | 2007042044 A1 | 4/2007 |

OTHER PUBLICATIONS

International Search Report for PCT/GB2014/050154 dated Apr. 24, 2014.
(Continued)

*Primary Examiner* — Siamak Harandi
(74) *Attorney, Agent, or Firm* — Caesar Rivise, PC

(57) ABSTRACT

The present invention relates to a method for determining a change in the mobility of a population of organisms over time, said method comprising: a) obtaining a first image (I1) of the population at a first time point (T1) b) obtaining a second image (I2) of the population at a second time point (T2) c) calculating the absolute differences between I1 and I2 (ΔD1) d) obtaining a third image (I3) of the population at a third time point (T3) e) obtaining a fourth image (I4) of the population at a fourth time point (T4) f) calculating the absolute differences between I3 and I4 (ΔD2). g) calculating the change between ΔD1 and ΔD2 to calculate a change mobility of the population as a whole.

17 Claims, 10 Drawing Sheets

(51) Int. Cl.
*G06K 9/00* (2006.01)
*G06T 7/254* (2017.01)

(52) U.S. Cl.
CPC .... *G06T 7/254* (2017.01); *G06T 2207/10056* (2013.01); *G06T 2207/30024* (2013.01)

(56) References Cited

U.S. PATENT DOCUMENTS

2008/0304732 A1    12/2008  Rittscher et al.
2012/0133756 A1*   5/2012   Levin ............... G02B 21/0088
                                                              348/79

OTHER PUBLICATIONS

Written Opinion for corresponding Singapore Patent Application No. 11201505649X dated May 5, 2017.
Hardin, J., "Imaging Embryonic Morphpgenesis", Methods in Cell Biology, vol. 106, 2011, pp. 377-412.
Pelowski, et al., "A novel high-throughput imaging system for automated analyses of avoidance behavior in zebrafish larvae", Behav Brain Res., vol. 223, No. 1, Sep. 30, 2011, pp. 135-144.

* cited by examiner

Examples *C. elegans* with GFP Localised to Different Regions

Brightfield Image of AM134

GFP Image of AM134 (body wall muscle localised)

GFP Image of MYO2 (pharynx localised)

A

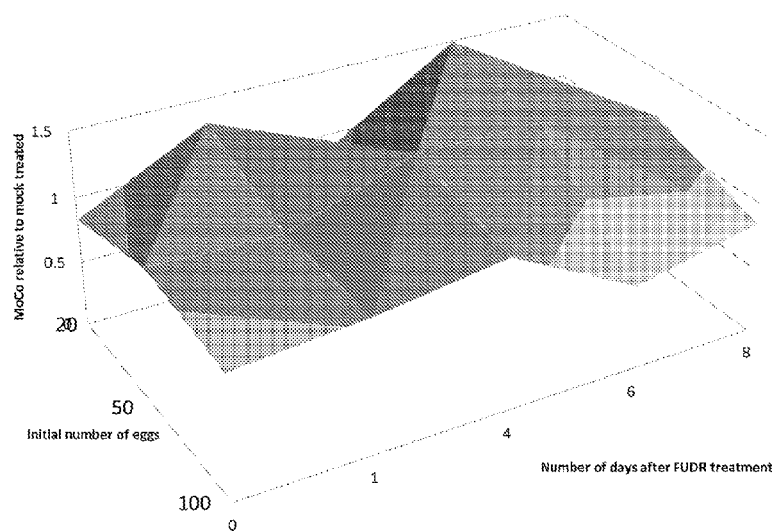
Figure 15
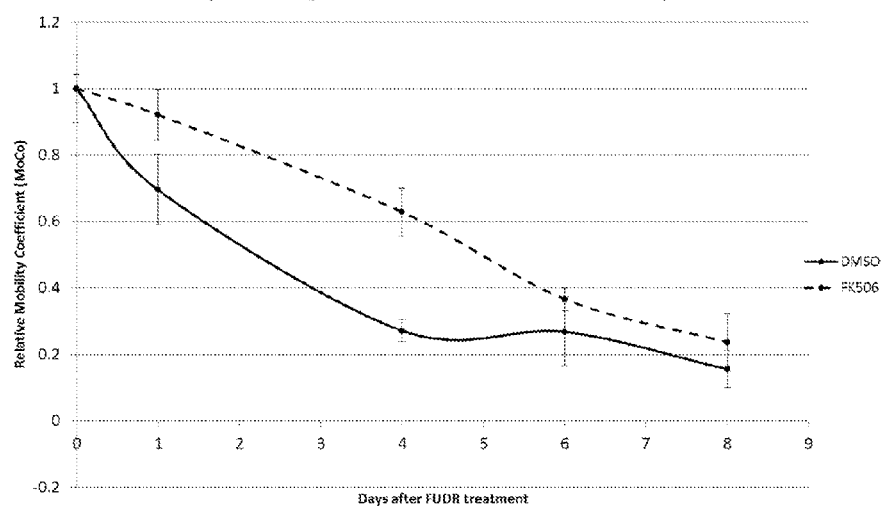

METHOD FOR ASSESSING CELL AGING

FIELD OF INVENTION

The present invention relates to a high throughput method for assessing the chronological lifespan (CLS) of a model organism, such as *Caenorhabditis elegans* (*C. elegans*).

BACKGROUND

*C. elegans* is a well-studied model used in ageing and has been utilised in the analysis of not only the fundamental processes which contribute to ageing, but also of age related diseases. Traditional techniques of lifespan evaluation involve the manual examination of a synchronised ageing population of *C. elegans* and assessment of the fraction of the population which are still living by means of individual physical stimulation. The data accumulated in this manner can be plotted over time to generate a Chronological Lifespan (CLS) profile. This method has the disadvantage that it is time consuming, subjective and subject to human error.

Automated methods for characterising cellular motion, such as those described in US2008/0304732, have been developed. However, these methods require significant computer processing power and time to perform complex image deconvolution and data analysis.

GB2479628 discloses a method for tracking the motion of a biological object. The method comprises the successive subtraction of a number of images from a reference image allowing the tracking of motion of a single biological object over time.

U.S. Pat. No. 5,789,242 describes a method for determining the toxicity of water-soluble substances by measuring the change in mobility of individual organisms within a population over time.

WO2007/042044 describes a method for determining a change in a cell population over time as a method for selecting embryos for in vitro fertilisation.

The development of a high throughput automated method for determining the mobility of a population of organisms would be of great advantage in ageing experiments. The inventors have developed such a method which can be used to assess the chronological lifespan of a model organism by examining the mobility of a given population. The mobility can then be quantified and expressed as a fraction of the number of organisms in the group to provide a mobility coefficient (MoCo).

SUMMARY OF INVENTION

According to a first aspect of the present invention there is provided a method for determining a change in the mobility of a population of organisms over time, said method comprising:
a) obtaining a first image (I1) of the population at a first time point (T1)
b) obtaining a second image (I2) of the population at a second time point (T2)
c) calculating the absolute differences between I1 and I2 ($\Delta D1$)
d) obtaining a third image (I3) of the population at a third time point (T3)
e) obtaining a fourth image (I4) of the population at a fourth time point (T4)
f) calculating the absolute differences between I3 and I4 ($\Delta D2$).
g) calculating the change between $\Delta D1$ and $\Delta D2$ to calculate a change in the mobility of the population as a whole.

It will be apparent to the skilled person that steps d) to g) of the method can be repeated at further time points to calculate the change in mobility of the population over time.

As used herein, the term mobility refers to the movement of members of the population of organisms.

It will be understood that the term mobility as used herein does not require measurement of the velocity or rate of movement of the organisms within the population. The measurement of the relative change in the velocity of the organisms forming the population over time is not required for the claimed methods. Furthermore, the term mobility refers to the mobility of the population as a whole, not to the mobility of individual organisms within the population.

In one embodiment, mobility refers to identifying the movement of the population of organisms in two dimensions, preferably on a solid media. It will be understood that in a preferred embodiment of the present invention the organisms are not immobilised in the media, but are able to freely move.

The skilled person will understand that the mobility of the population of organisms can be equivalent to the viability of the population. The skilled person will understand that as organisms age, in general, they become less mobile and upon death cease movement entirely. When taken at a population level the change in overall mobility over time can be equated to the viability of the population.

It will be apparent that $\Delta D1$ is the mobility of the population at a first time point (for example day 0). It will be further apparent that $\Delta D2$ is the mobility of the population at a second time point. The skilled person will understand that the change in mobility between $\Delta D1$ and $\Delta D2$ is equivalent to the change in the viability of the population over that time period.

It will be understood that size of $\Delta D$ is proportional to the mobility of the whole imaged population and is calculated by comparing appropriate pairs of images, e.g. the first (I1) and second (I2) images, and calculating the difference between their derived matrices (i.e. images converted to tables of pixel intensity) in respect of the population in its entirety. Absolute values (i.e. negative values are converted into positive values) from the difference between the two matrices are summed. This value can be divided by the average signal input (the average sum of the intensity of the images I1 and I2) to account for any variation in the number of worms on each plate. This value is defined herein as the Mobility Coefficient (MoCo) and is a measure of the proportion of the imaged population that are mobile. The positions of the organisms forming the population may optionally be compared indirectly by comparing the matrices. It will be understood that the method does not rely on calculating the position of each individual organism or where each organism has moved to, or on measuring the distances moved by individual organisms. The method involves calculating the absolute difference between the first and second images i.e. how many of the organisms have moved from their starting positions. This allows a method for calculating the relative mobility of the whole population over time, allowing the development of high throughput screening methods. It will be further understood that using this method quantitative mobility data can be obtained from a comparison of the images.

It will be understood that the methods relate to the measurement of the absolute change in position of the population as a whole and not the separate analysis of one or more individual organisms within the population.

In one embodiment, the time period between I1 and I2 (and any subsequent pair of images, for example I3 and I4) is preferably, about 100 ms to about 5 minutes, about 140 ms to about 3 minutes, about 200 ms to about 90 s, about 300 ms to about 1 minute, about 400 ms to about 45 s, about 500 ms to about 30 s, about 600 ms to about 15 s, about 700 ms to about 10 s, about 750 ms to about 5 s, about 800 ms to about 3 s, about 850 ms to about 2 s, about 900 ms to about 1 s or about 1 s to about 2 s.

In a second embodiment, the time period between I1 and I2 (and any subsequent pair of images, for example I3 and I4) is preferably about 500 ms, about 800 ms, about 1 s, about 2 s, about 3 s, about 4 s, about 5 s, about 6 s, about 7 s, about 8 s, about 9 s or about 10 s. Most preferably about 1 s.

It will be apparent to the skilled person that the amount of time allowed to elapse between the two images will dictate how far the members of the population of organisms will move in the interim period.

It will be understood by the skilled person that the time period between I1 and I2 (and any subsequent pair of images, for example I3 and I4), may vary depending upon the organism used in the method. It will be understood that the time period should be sufficient to allow movement of the organisms from their starting locations but not long enough to allow the organisms to move to the starting location of another organism in the population.

It will be readily apparent to the skilled person that the time period between I1 and I2 and the time period between I3 and I4 and any subsequent pair of images should be the same.

It will be apparent to the skilled person that the time period between I2 and I3 can be any suitable time period.

It will be understood that the time period can be any suitable period according to the lifespan of the organism being tested.

In one embodiment, the time period between I2 and I3 is at least about 6 hours, at least about 12 hours, at least about 1 day, at least about 2 days, at least about 3 days, at least about 4 days, at least about 5 days, at least about 6 days, at least about 7 days, at least about 8 days, at least about 9 days, at least about 10 days, at least about 11 days or at least about 12 days. Preferably, at least about 1 day, more preferably at least about 2 days and most preferably at least about 4 days.

In one preferred embodiment, ΔD1 is calculated from images obtained on day 0 and ΔD2 is calculated from images obtained on day 4. The time period between I1 and I2, and I3 and I4 is preferably 1 s.

In a further preferred embodiment, ΔD1 is calculated from images obtained on day 0 and ΔD2 is calculated from images obtained on day 6. The time period between I1 and I2, and I3 and I4 is preferably 10 s.

In a further preferred embodiment, ΔD1 is calculated from images obtained on day 0 and ΔD2 is calculated from images obtained on day 6. The time period between I1 and I2, and I3 and I4 is preferably 1 min.

In a further embodiment, when changes in mobility over time are measured a chronological lifespan profile can be calculated. It will be readily apparent to the skilled person that an increase in the mobility of the organisms over time equates to an increase in the chronological lifespan of the organisms.

It will be apparent to the skilled person that images are taken at suitable time intervals to enable identification and measurement of changes in movement of the population over time as a surrogate for the decline in viability.

It will be readily apparent to the skilled person that in preferred embodiments the time period between the sets of images (I1 and I2, I3 and I4) should be the same for each set of time points.

As used herein, the term population refers to a plurality of organisms that, in one embodiment, belong to the same group or species. It will be understood by the skilled person that an organism can be any suitable organism (such as an animal, micro-organism, or single-celled life form) capable of movement. It will be understood that in one preferred embodiment the term movement refers to locomotion and not, for example, contraction of a cell such as a cardiomyocyte or movement of a cell or cells caused by cell division such as occurs, for example, in an embryo or other dividing cell mass.

In one embodiment, the population comprises at least about 2, at least about 5, at least about 10, at least about 20, at least about 50, at least about 75, at least about 100, at least about 110, at least about 120, at least about 150, at least about 175, at least about 200, at least about 250, at least about 300, at least about 350, at least about 400, at least about 450, at least about 500, at least about 550, at least about 600, at least about 650, at least about 700, at least about 750, at least about 800, at least about 850, at least about 900, at least about 950 or at least about 1000 organisms.

In a further embodiment the population comprises about 5 to about 1000, about 10 to about 750, about 20 to about 500, about 50 to about 300, about 50 to about 200, about 75 to about 200, about 80 to about 150, about 90 to about 125 or about 95 to about 100 organisms.

In a further preferred embodiment the population comprises 50, 75, 80, 90, 100, 110, 125, 150, 175 or 200 organisms.

As used herein, the term image refers to a visual representation of the population of organisms. It will be understood that the image can be obtained by any suitable means, for example by scanning with a detector or electromagnetic beam. In one embodiment, a wide screen microscope is used. In a further embodiment, a fluorescent plate reader is used.

In one embodiment the organisms can be labelled.

In a preferred embodiment, the population of organisms are fluorescently labelled by any suitable means. In a further preferred embodiment the population of organisms are labelled with green fluorescent protein (GFP).

The inventors have discovered that by using organisms with the label localised to one particular area within the organism the data generated for determining the change in mobility is more accurate. The skilled person will understand that this allows denser populations to be used reducing sampling errors.

In one embodiment, the organisms are *C. elegans*. Preferably, GFP expressing *C. elegans*. More preferably *C. elegans* with GFP expression in the body wall muscle In another embodiment the organisms are *Danio rerio*. Preferably GFP expressing *Danio rerio*. More preferably, *Danio rerio* with GFP expression in the body wall muscle.

In one preferred embodiment, GFP expression is localised to one particular area within the labelled organisms.

In a more preferred embodiment the organisms are *C. elegans* MYO2bus-5 (a drug sensitive worm expressing GFP in its pharynx)

Furthermore, the inventors have discovered that the use of two labelled loci within a single organism allows for identification of specific head and/or tail movement. This allows behavioural and paralysing side effects to be accounted for when calculating viability.

The skilled person will be aware of methods for creating fluorescently labelled organisms which is part of the common general knowledge.

An algorithm is used to analyse the change in the position of input signals between image pairs. The algorithm converts the images to grey scale, thresholding them and comparing images mathematically by calculating the absolute differences between the two images. This value is then divided by the average input signal to express the mobility of a population as a fraction of the population size. This value is referred to as the Mobility Coefficient (MoCo).

The inventors have also made the surprising discovery that during the period between the first and second or subsequent time points a proportion of the organisms may escape. Therefore, division by the average input signal takes account of this reduction in organism numbers. It will be understood that the mobility coefficient (MoCo) will be proportional to the total number of organisms present compared to the initial number.

It will be apparent to the skilled person that present invention is not directed towards measuring a change in the size of the population, i.e. increased or decreased absolute numbers, but is directed to identifying a change in the mobility and hence viability of the population. Therefore, maintenance of population size, or taking account of changes in population size is desirable.

It will be understood that several images with the same time interval between them can be assessed in the above manner, allowing the generation of averages and error statistics.

In one embodiment, the algorithm is used to calculate a change in the mobility of the population.

In a further embodiment, binning can be used to alter the sensitivity of the method. The skilled person will be aware that binning involves summing cells in the image matrix before calculating the difference between paired images. It will be apparent that increasing the Bin size artificially reduces the sensitivity of the assay. The Inventors have discovered that this allows for the detection of changes in mobility in older, less mobile populations.

In one embodiment, a Bin value of 1 to 100, 2 to 75, 3 to 50, 4 to 25 or 5 to 10 is used in the algorithm. In a preferred embodiment, a Bin value of 1, 5, 10, 50 or 100 is used in the algorithm. In a more preferred embodiment the Bin value of 1 is used.

In one embodiment, the method can be used to assess the effect of at least one test compound or at least one environmental factor on the viability/CLS of the population. It will be readily apparent that at least one test compound may be any suitable compound, for example, one or more small molecules or biological compositions. It will further be readily apparent that the test compound can be applied to the organisms by any suitable means, for example, the test compound may by applied topically, or may be located within the medium upon which the organisms are maintained.

It will be further apparent that the at least one environmental factor can be any environmental factor of interest, such as temperature, light or atmospheric factors, one or more nutritional conditions such as, for example a nutritional supplement or deficiency. It will also be readily apparent that the atmospheric factor can be any factor of interest such as pollution level, atmospheric composition, moisture level etc.

It will be apparent to the skilled person that any suitable test compound, such as a compound contained in a combinatorial library, can be used in the method of the present invention. It will be further apparent that any compound which, for example, extends the CLS of the test organisms as measured via their mobility will be a candidate compound which may be useful in, for example, combating the effects of aging or for the treatment of an age related disorder. It will further be apparent that any compound which reduces the CLS of the test organisms may have toxic effects.

According to a second aspect of the present invention there is provided the use of the method according to the first aspect for drug discovery and/or toxicology.

According to a third aspect of the present invention there is provided a method for assessing a change in the viability of a population of organisms comprising subjecting the population to the method of the first aspect.

According to a fourth aspect of the present invention there is provided a method for assessing aging of a population of organisms comprising subjecting the population to the method of the first aspect.

This is achieved by calculating the overall change in the mobility coefficient as observed in an entire population of organisms over time compared to a control population. In a preferred embodiment the organisms are *C. elegans*.

It will be apparent to the skilled person that the organisms can be maintained in any suitable apparatus, for example a petri dish/single well plate or a multi-well plate. In one embodiment, the population is maintained in a single-well plate. In another embodiment, the population is maintained in a well of a multi-well plate, wherein each well comprises a separate population. In further embodiments, the method is carried out using 6 well, 12 well, 24 or 96 well plates. In a preferred embodiment, the method is carried out using 12 well plates.

The skilled person will be aware that FUDR is a chemotherapeutic drug which is used in *C. elegans* studies to prevent the formation of second generation progeny which would otherwise complicate ageing experiments, and to produce age synchronous populations. FUDR prevents DNA synthesis and therefore eggs do not hatch and young worms do not develop. In traditional assays treatment with FUDR occurs by transferring adult worms grown on media, for example, NGM agar plates, in the absence of the drug, to a plate which has been soaked with an FUDR solution (transfer method).

The inventors have discovered that generation of age-synchronous *C. elegans* populations by topical FUDR addition is possible and is preferable to transfer methods because the method can be carried out on a single plate or well without the need to transfer the worms and with the minimum of maintenance.

It will be understood that following synchronization of the population in either a single or multi-well plate, the population is treated topically with FUDR, wherein the population is not transferred to a new plate or well.

It will be apparent to the skilled person that other drugs which perform the same function as FUDR can equally be used in both the transfer and topical methods.

In a preferred method, following synchronization of the population in a multi-well plate, the population is treated topically with FUDR at a level of at least 0.5 µg/ml media, at least 1.0 µg/ml, at least 1.5 µg/ml, at least 1.7 µg/ml, at least 2.0 µg/ml, at least 2.5 µg/ml, or at least 3 µg/ml.

In a first preferred embodiment, following synchronization of the population in a 12 well plate, the population is treated topically with 1.7 µg FUDR/ml media.

In a second preferred embodiment, following synchronization of the population in a 6 well plate, the population is treated topically with 2 µg FUDR/ml media.

In a third preferred embodiment, following synchronization of the population in a 24 well plate, the population is treated topically with more than 2 µg FUDR/ml media.

It will be apparent to the skilled person that synchronisation of the population should be undertaken prior to obtaining the first image (I1).

According to a fifth aspect of the present invention there is provided a computer program comprising instructions operable to configure a data processing apparatus to perform the method according to any of the previous aspects.

The Invention will be further described in the Examples with reference to the following figures in which:

FIG. 2 shows a comparison of FUDR treatment of AM134bus-5 mutant *C. elegans* by transfer and topical application techniques on 12 well plates. Images show a synchronised worm population at various time points on a 12 well plate with an FUDR addition after 1 day growth (13-09).

FIG. 3 shows a comparison of FUDR treatment of AM134bus-5 mutant *C. elegans* by transfer and topical application techniques on 24 well plates. Images show a synchronised worm population at various time points on a 24 well plate with an FUDR addition after 1 day growth (13-09).

Figure 4:
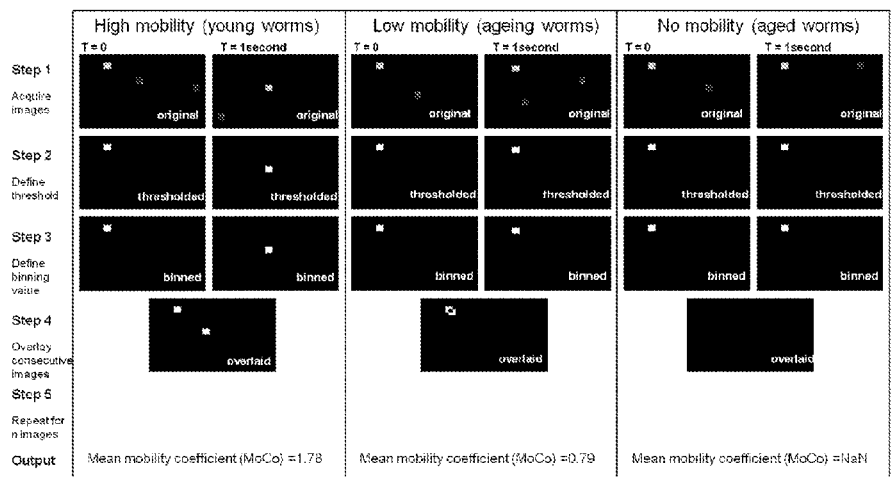

FIG. 4 summarizes the MatLab algorithm and the processing and analysis of time lapse GFP images of *C. elegans*.

Figure 5:
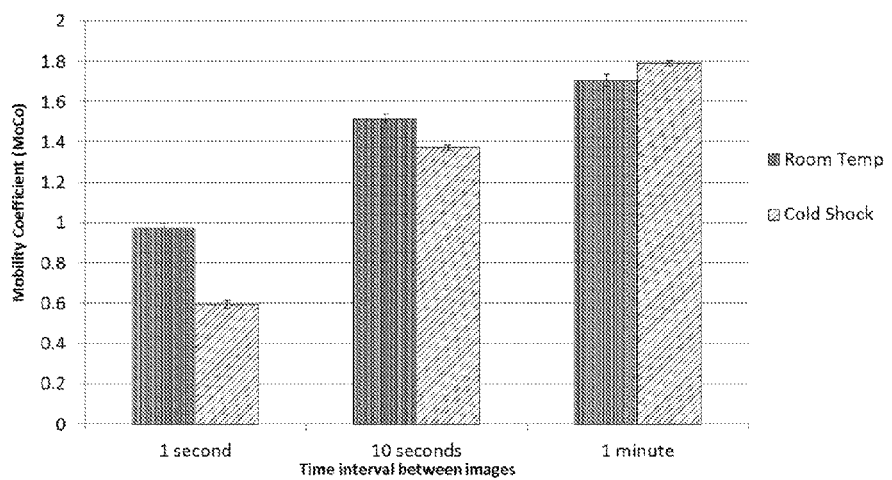

FIG. 5 shows the effect of varying the image separation time on MoCo calculated from AM134bus-5.

Figure 6:
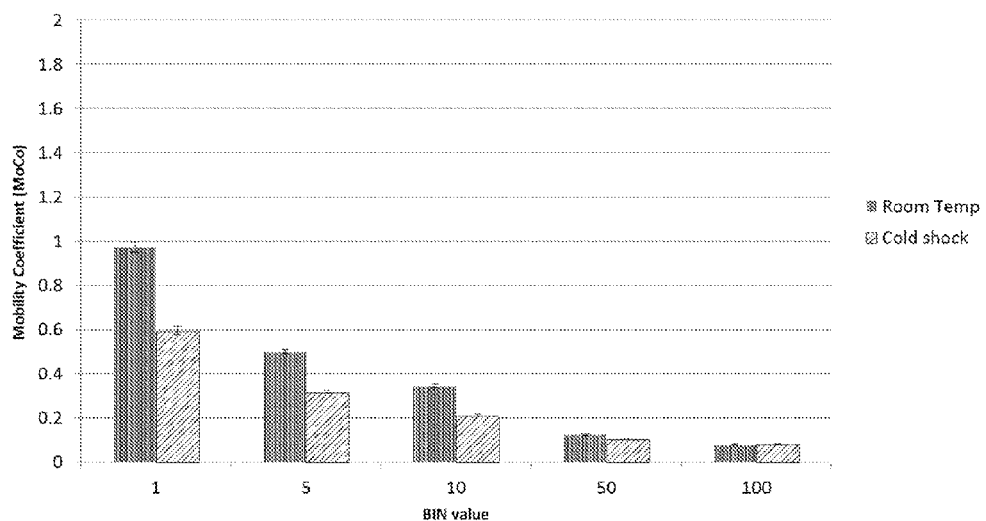

FIG. 6 shows the effect of varying bin size on MoCo calculated from AM134bus-5.

Figure 7:
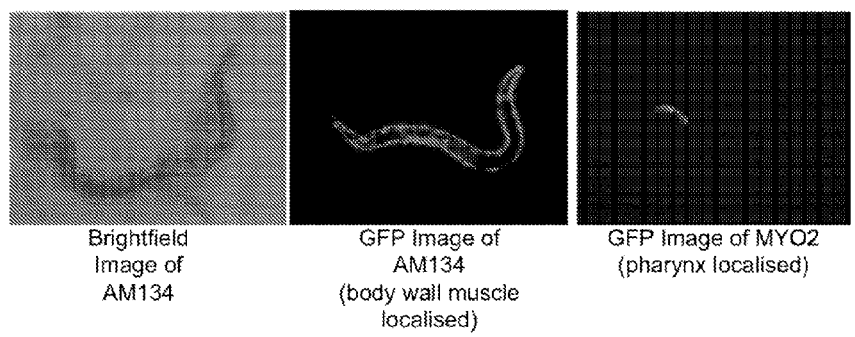

FIG. 7 shows different GFP Localisation Strains of *C. elegans*.

Figure 8:
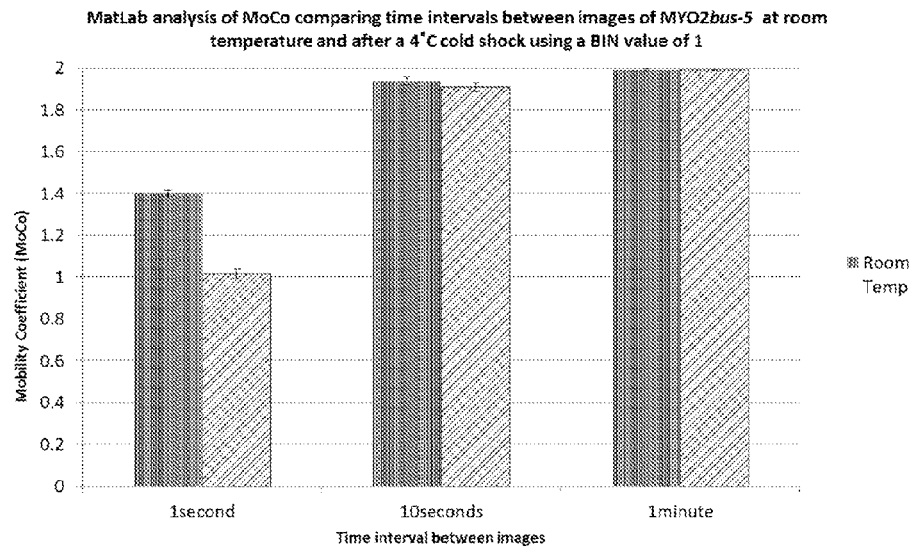

FIG. 8 shows the effect of varying the image separation time on MoCo calculated from MYO2bus-5 *C. elegans*.

Figure 9:
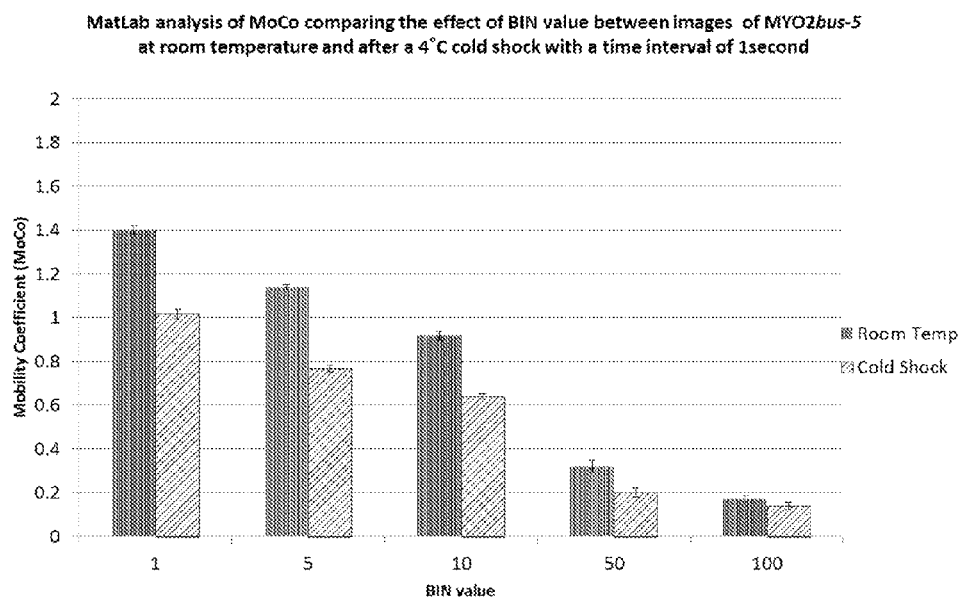

FIG. 9 shows the effect of varying bin size on MoCo calculated from MYO2bus-5 *C. elegans*.

Figure 10:
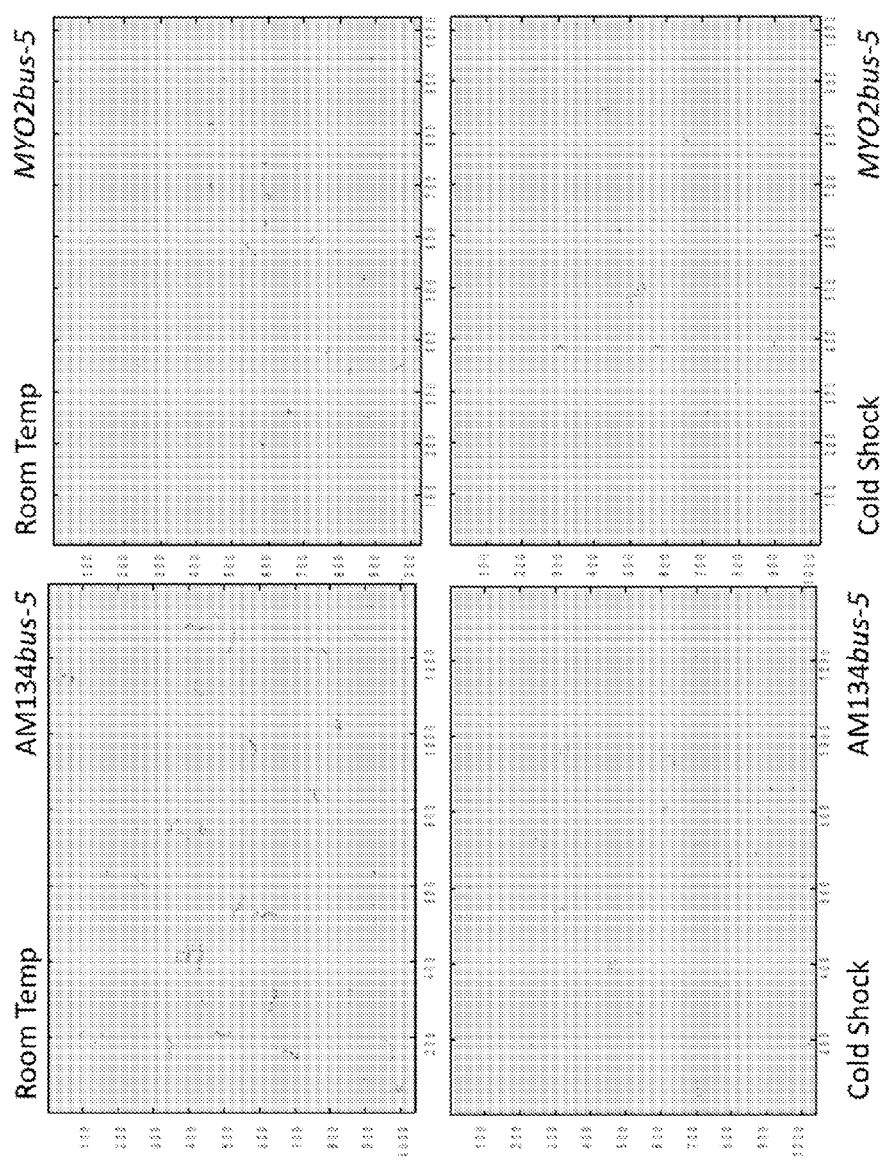

FIG. 10 shows the MoCo matrices from the experiments using AM134bus-5 and MYO2bus-5 *C. elegans*.

Figure 11:
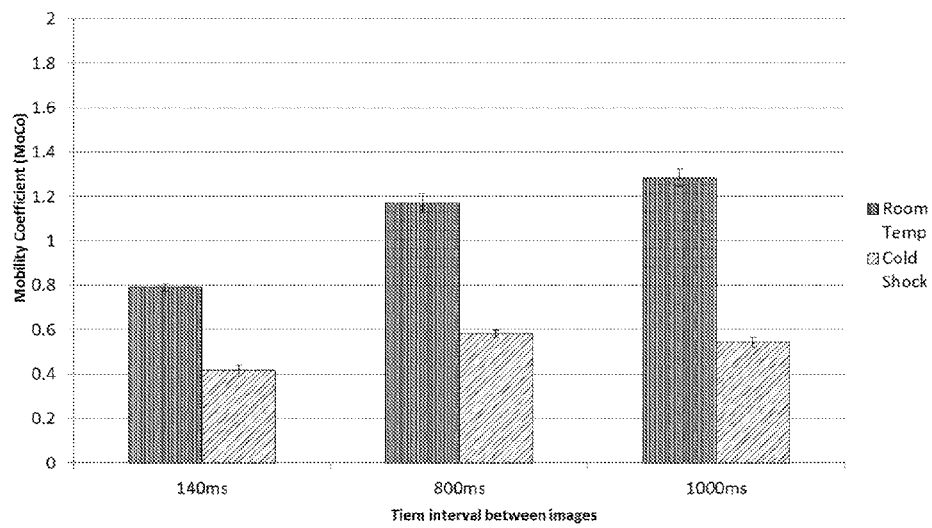

FIG. 11 shows a summary of results for MYO2bus-5 worms and a time interval between each of ten consecutive images of 140 ms, 800 ms and 1 second and a BIN value of 1.

Figure 12:
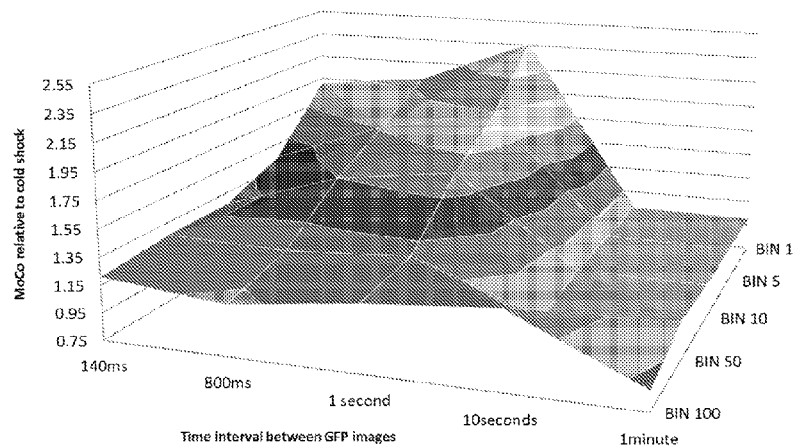

FIG. 12 shows the effect of both changing the time interval between GFP time lapse images during image acquisition and the BIN value during MatLab analysis on the MoCo that is calculated in a population of MYO2bus-5 *C. elegans* at room temperature (high mobility) relative to the same population of worms after a cold shock at 4° C. for one hour (low mobility).

Figure 13:
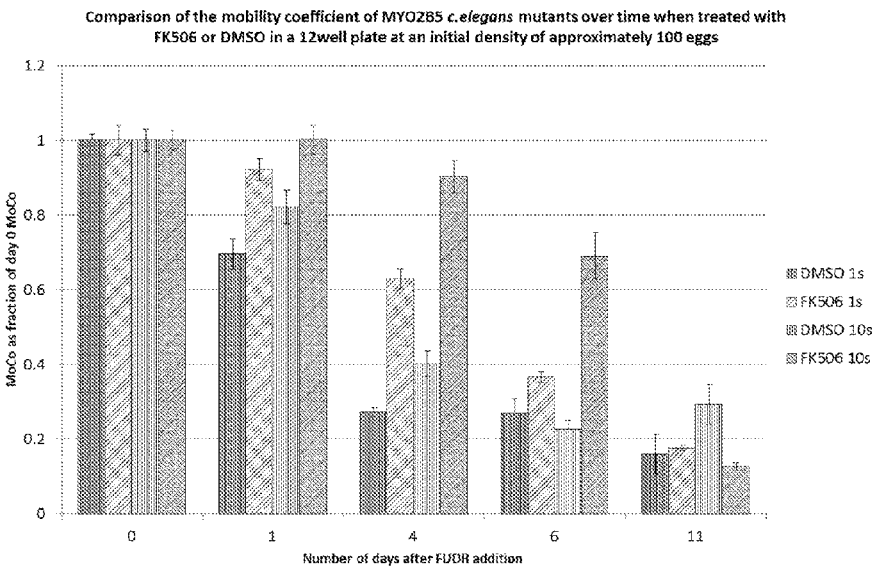

FIG. 13 shows the relative MoCo of a population of worms in a 12 well plate with wells treated with FK506 or DMSO following FUDR treatment on day 0.

Figure 14:
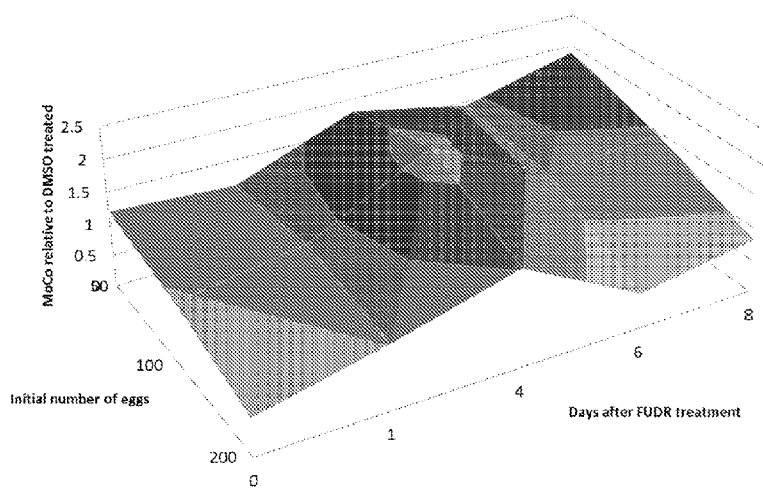

FIG. 14 shows the effect of day of measurement and of worm density on the relative effect of FK506 on the MoCo.

Figure 16:
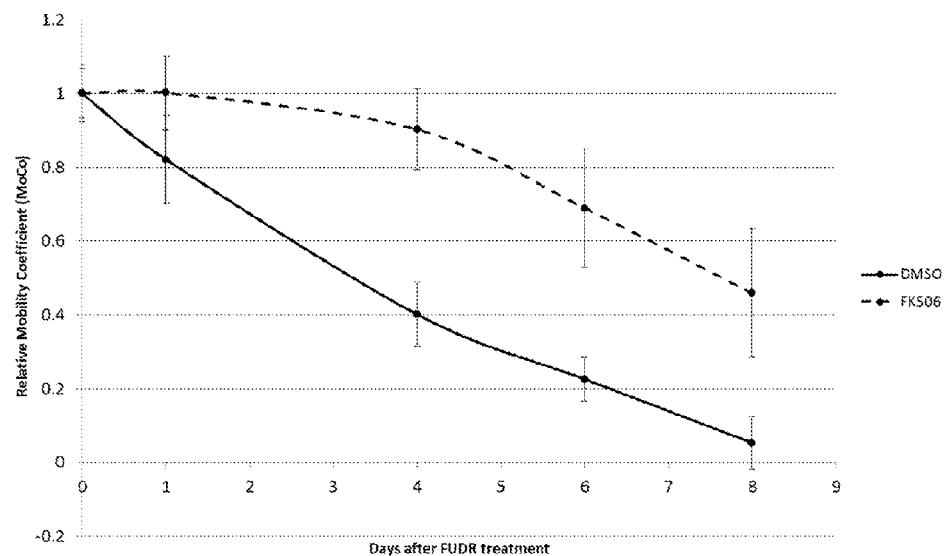

FIG. 15 shows a comparison of the MoCo in 42 MYO2bus-5 worms mock treated with 10 µl DMSO and 51 MYO2bus-5 worms treated with FK506 using a time interval of 1 s between images FIG. 16 shows a comparison of the MoCo in 42 MYO2bus-5 worms mock treated with 10µl DMSO and 51 MYO2bus-5 worms treated with FK506 using a time interval of 10 s between images

EXAMPLES

Example 1 Optimisation of FUDR Concentration and Mechanism of Application for Single Plate Lifespan Assays 2'-Deoxy-5-fluorouridine (FUDR) is a chemotherapeutic drug which is used in *C. elegans* studies to prevent the formation of second generation progeny which would otherwise complicate ageing experiments. FUDR prevents DNA synthesis and therefore eggs do not hatch and young worms do not develop. Traditionally treatment occurs by transferring adult worms grown on NGM agar plates in the absence of the drug using M9 buffer to a plate which has been soaked with an FUDR solution (transfer method). Transferring worms in this manner is a time consuming and thus expensive process. Due to the adhesion of live worms to plasticware it is also error prone resulting in variability in the number of worms per ageing population.

Experiments were undertaken to compare the traditional transfer method with a novel time saving and error lowering approach in which the FUDR is topically added to the ageing population (topical method).

The topical method allows ageing experiments to be carried out on a single plate with the minimum of maintenance. The use of various sized wells in multi-well dishes was compared to determine their suitability for carrying out ageing assays in order to optimize the most suitable plates for use in high throughput assays.

Topical and transfer methods of FUDR application were compared and the optimal concentration of the FUDR on 24 well, 12 well and 6 well plates, assessed.

AM134bus-5 and bus-8 drug sensitive worms were synchronized by bleaching and then plated onto multi-well plates and allowed to develop to adulthood. The adults in half of the wells were transferred to a separate well which had been soaked with varying amounts of FUDR solution using M9 buffer. The remaining wells were treated topically with FUDR.

The cultures were then regularly imaged by bright field microscopy and fed with OP50 when necessary.

Figure 1:
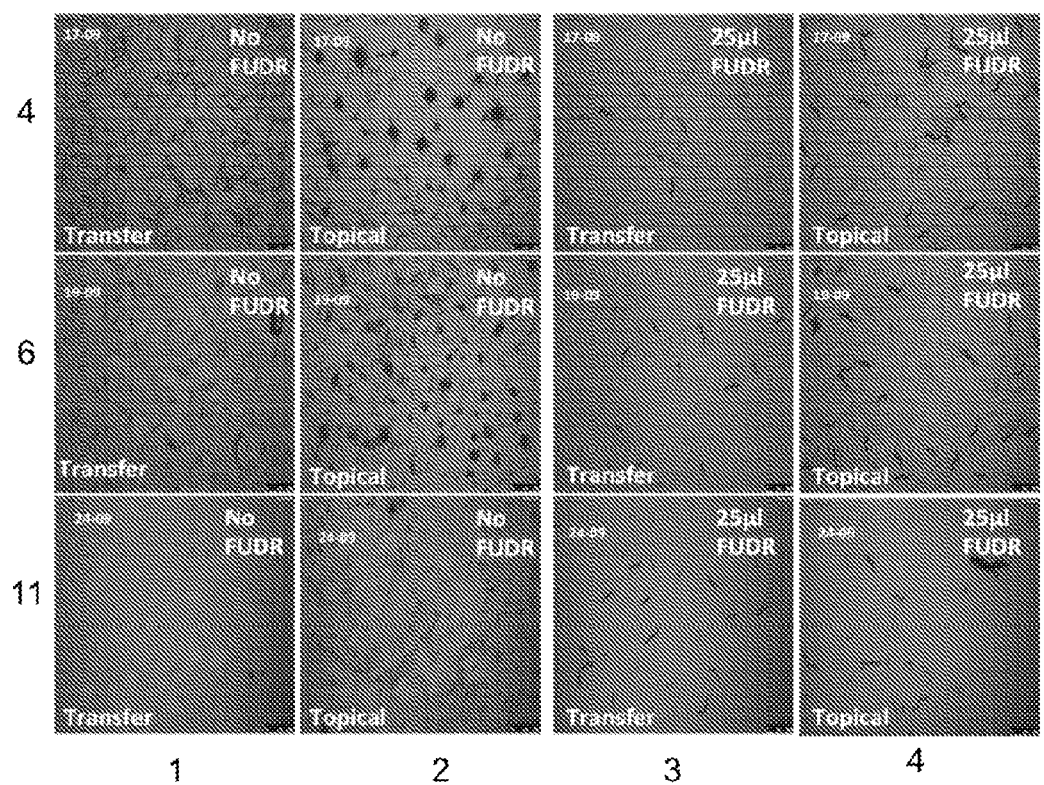
FIG. 1 shows a comparison of FUDR treatment of AM134bus-5 mutant *C. elegans* by transfer and topical application techniques on 6 well plates. Images show a synchronised worm population at various time points on a 6 well plate with either no FUDR or FUDR addition after 1 day growth (13-09).

FIG. 1 shows a comparison of FUDR treatment of AM134bus-5 mutant *C. elegans* by transfer and topical application techniques on 6 well plates. Images show a synchronised worm population on a 6 well plate with an FUDR addition after 1 day (13-09). Results are shown 4 (17-09), 6 (19-09) and 11 (24-09) days after treatment.

Columns 1 and 2 show wells that have no FUDR added. In these wells numerous worms of a variety of different ages are present making lifespan assessment impossible.

Columns 3 and 4 show wells with a FUDR concentration of 2 µg/ml (25 µl of 10 mg/ml FUDR to 5 ml of NGM). Even after 11 days under these conditions, no progeny can be observed. FUDR volumes of 1 µl, 5 µl, 10 µl, 25 µl and 50 µl were tested in this manner and 25 µl was identified as the lowest effective dose at preventing the development of progeny. As can be seen from columns 3 and 4 both topical and transfer methods were successful at preventing second generation progeny developing.

Figures 2, 3:
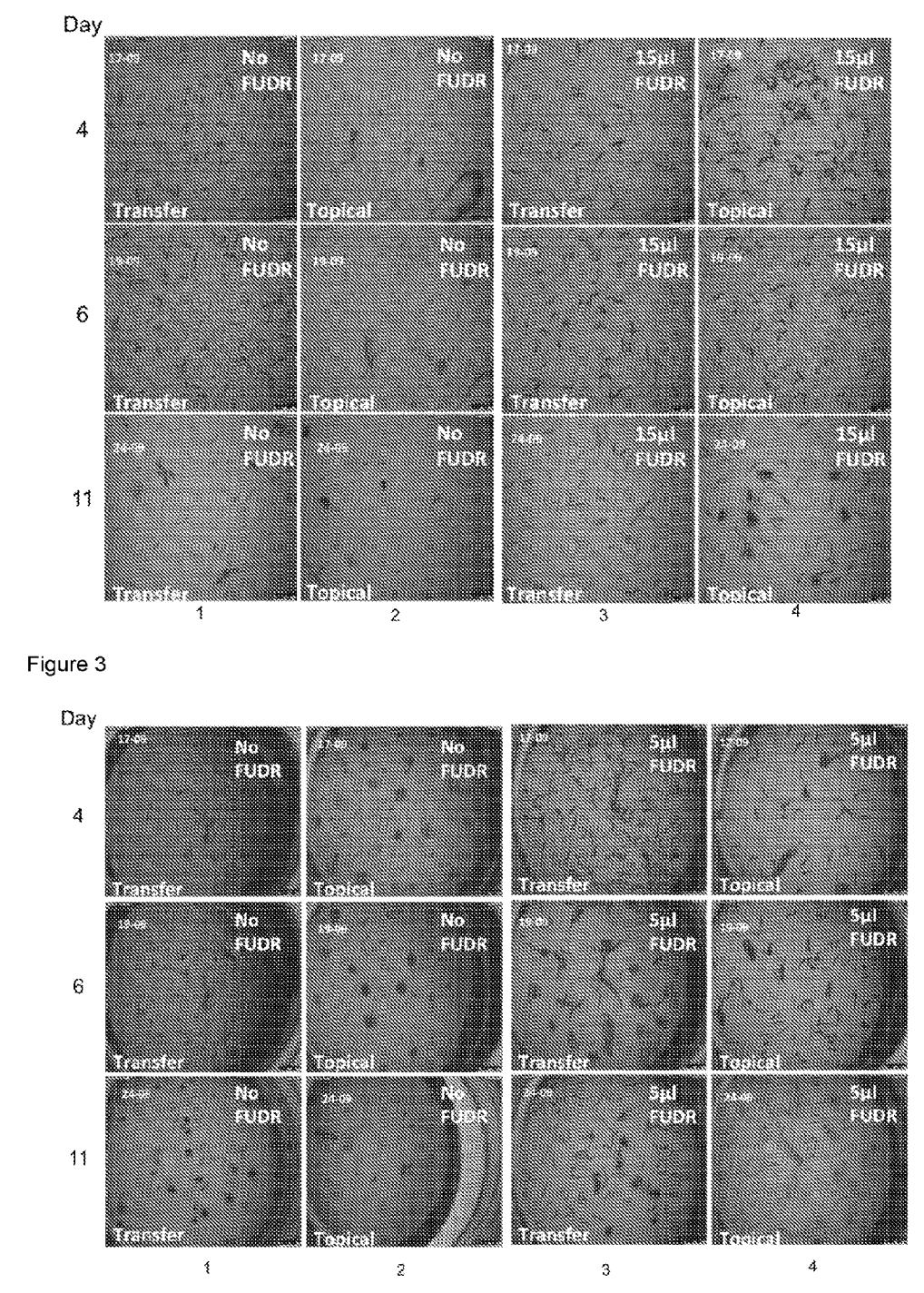

FIG. 2 shows a comparison of FUDR treatment of AM134bus-5 mutant *C. elegans* by transfer and topical application techniques on 12 well plates. Images show a synchronised worm population on a 12 well plate with an FUDR addition after 1 day (13-09). Results are shown 4 (17-09), 6 (19/09) and 11 (24/09) days after treatment.

Columns 1 and 2 show wells that have no FUDR added. In these wells numerous worms of a variety of different ages are present particularly at day 11 (24-9) making lifespan assessment impossible.

Columns 3 and 4 show wells with a FUDR concentration of 1.7 μg/ml (15 μl of 10 mg/ml FUDR to 2.5 ml of NGM). Even after 11 days under these conditions for the topical application, no progeny can be observed (see bottom of column 4). FUDR volumes of 1 μl, 5 μl, 10 μl, 15 μl and 20 μl were tested in this manner and 15 μl was identified as the lowest effective dose at preventing the development of progeny. Topical application appears to be more effective at preventing progeny than the transfer method under these conditions (compare bottom images in column 3 and 4).

FIG. 3 shows a comparison of FUDR treatment of AM134bus-5 mutant *C. elegans* by transfer and topical application techniques on 24 well plates. Images show a synchronised worm population on a 24 well plate with an FUDR addition after 1 day (13-09). Results are shown 4 (17-09), 6 (19/09) and 11 (24/09) days after treatment.

Columns 1 and 2 show wells that have no FUDR added. In these wells numerous worms of a variety of different ages are present making lifespan assessment impossible.

Columns 3 and 4 shows wells with the a FUDR concentration of 2 μg/ml (5 μl of 10 mg/ml FUDR to 1 ml of NGM). After 11 days under these conditions for the topical and transfer method, progeny can be observed (bottom of column 3 and 4). FUDR volumes of 1 μl, 2 μl, 3 μl, 4 μl and 5 μl were tested in this manner. From these experiments it is clear that more FUDR would need to be added to the wells on this plate in order to prevent second generation progeny interfering with the measurements. However the propensity of these small wells to dry out, crack and pull away from the sides meant they were not considered suitable for purpose.

Conclusions

These experiments indicate that generation of age-synchronous *C. elegans* populations by topical FUDR addition is possible and is preferable to the standard M9 buffer transfer methods. The data shows that the optimal experimental parameters for preventing progeny worms from developing in this assay is the addition of 15 ul of 10 mg/ml FUDR per well in a 12 well plate (1.7 ug/ml in 2.5 ml NGM)

Example 2 Optimisation of Computational Analysis Parameters and Strain Type

The novel assay of the present invention uses the relative mobility of a population of worms as a surrogate for the viability of the population. When changes in viability over time are measured a chronological lifespan profile can be calculated.

To this end a MatLab algorithm (see FIG. 4) has been written to analyse the change in the position of GFP signals between pairs of wide field images (i.e. images encompassing numerous worms—5 to 500). The code (shown in appendix 1) converts the images to grey scale, thresholds them and compares images mathematically by calculating the absolute differences between the two images. This value is then divided by the average input signal to express the mobility of a population as a fraction of the population size. This value is referred to as the Mobility Coefficient (MoCo). Several images with the same time interval between them are assessed in this manner allowing the generation of averages and error statistics.

Binning can be used to alter the sensitivity of the analysis. Binning involves summing cells in the image matrix (e.g. 1×1 no binning—2×2 binning groups 4 cells together) before calculating the difference between paired images. In theory, increasing the bin size would artificially reduce the sensitivity of the assay allowing for the detection of changes in mobility in older less mobile populations.

Experiments were carried out in order to confirm the use of the algorithm in detecting changes in mobility and optimize the time allowed to elapse between images and the binning size for this type of analysis.

FIG. 4 summarizes the MatLab algorithm and the processing and analysis of time lapse GFP images of expressing *C. elegans*.

Step 1 Acquire images—the amount of time allowed to elapse between the two images will dictate how far the worms move in the interim period.

Step 2 Define threshold—converting the image to grey scale and removing the background reduces noise and simplifies later analysis.

Step 3 Binning—the remaining signals are binned to combine a specified number of pixels (A×A binning).

Step 4—overlay consecutive images and calculate the absolute difference between them. This provides a quantitative estimate of mobility.

The left hand panel of FIG. 4 shows that high mobility worms move relatively far such that when the image is processed the signals do not over lap generating a high MoCo.

Conversely no mobility worms (right hand panel) overlap absolutely and thus there is no absolute difference between the images, the result of which is a MoCo of 0 (NaN—right hand column).

The signals from low/intermediate mobility worms (middle panel) partially overlap resulting in an intermediate MoCo value.

The process is repeated for numerous images and by analysing them sequentially mean values and measures of error are calculated.

Example 3 Optimisation of Temporal Separation of the Image Pairs and the Bin Size on Worms Immobilized by Cold Shock Experiments were undertaken to optimize both the temporal separation of the image pairs and the bin size on worms immobilized by cold shock. A population of AM134bus-5 (GFP expression in body wall muscle) mutant *C. elegans* was synchronized by bleaching. The hatched worms were matured to adulthood and time lapse GFP images taken by fluorescent microscopy. Images were taken every 1 second for 10 seconds, every 10 seconds for 1 minute and every minute for 5 minutes. In order to reduce the mobility of the worms in the population to confirm the efficacy and optimize the described algorithm, the worms were immobilized by cold shock. To achieve this, the plates were placed at 4° C. for 1 hour and then imaging was repeated as above.

FIG. 5 shows the effect of varying the image separation time on MoCo calculated from AM134bus-5. FIG. 5 shows the effect of different time intervals between consecutive images on the calculated MoCo values of worms with normal mobility (room temperature) and low mobility (cold shock). AM134bus-5 worm populations were imaged every 1 second for 10 seconds (total 10 images), every 10 seconds for 1 minute (total 6 images) and then every 1 minute for 5 minutes (total 5 images). Images were analysed with a BIN value of 1. The error bars correspond to the standard error of mean whereby n=the number of images−1. A time interval of 1 s gives the biggest difference between the two conditions. The data from these images was used to optimise the bin size.

1 s was previously identified as the optimal image separation for detecting changes in cold induced MoCo reduction. FIG. 6 shows the effect of varying the BIN size during the MatLab analysis on the MoCo values in AM134bus-5 worms of normal (room temperature) and low mobility (cold shock) for 1 s separated images. The analysis for each condition is of the same 10 consecutive images taken at time intervals of 1 second and MoCo represents the mean mobility coefficient measured between the images. The error bars represent the standard error of mean calculated using the MatLab generated standard deviation values and where n−1=9. As can be seen from FIG. 6 a Bin value of 1 (i.e. no binning) gives the largest relative difference between the two conditions.

Example 4 Influence of Strains with Different GFP Expression Localisations

In order to compare the influence of strains with different GFP expression localisations (i.e. GFP can be found in a different part of the worm) a repeat experiment was undertaken with MYO2bus-5 (GFP expression in the more localized pharynx area) C. elegans. By using worms with smaller regions of GFP expression the data generated is more accurate and allows denser worm populations to be grown.

FIG. 7 shows different GFP Localisation Strains of C. elegans. The bright field image shows a the profile of a whole worm. The central image is of AM134 and shows the region of expression in this strain (body wall muscle). The right hand image is of a MYO2 strain showing more localised GFP expression in the pharynx.

FIG. 8 shows the effect of different time intervals between consecutive images on the calculated MoCo values of worms with normal mobility (room temperature) and low mobility (cold shock) as described above for a population of MYO2bus-5 worms. Images were taken every 1 second for 10 seconds (total 10 images), every 10 seconds for 1 minute (total 6 images) and then every 1 minute for 5 minutes (total 5 images). Images were analysed with a BIN value of 1 and the error bars correspond to the standard error of mean whereby n=the number of images−1. A time interval of 1 s gives the biggest difference between the two conditions. The data from these images was used to optimise the bin size (see FIG. 9).

The previous experiments identified 1 s as the optimal image separation for detecting cold induced MoCo change. FIG. 9 shows the effect of varying the BIN size of the MatLab analysis on the MoCo values in MYO2bus-5 worms of normal (room temperature) and low mobility (cold shock) for 1 s separated images. The analysis for each condition is of the same 10 consecutive images taken at time intervals of 1 second and MoCo represents the mean mobility coefficient measured between the images. The error bars represent the standard error of mean calculated using the MatLab generated standard deviation values and where n−1=9. As can be seen from the figure on the following page a Bin value of 1 (i.e. no binning) gives the largest relative difference between the two conditions.

FIG. 10 shows a comparison of MoCo Matrices of AM134bus-5 and MYO2bus-5 C. elegans mutants. During the mat lab analysis pairs of images are thresholded and compared mathematically by calculating the absolute difference between the images. These Mobility Coefficient Matrices give a visual account of which part of the plates the mobile worms are on and of the size and origin of the derived MoCo values. Image separation of 1 s and no binning was used for this data. The matrices show there are more localised differences in GFP signal changes between images when MYO2bus-5 worms are imaged in comparison to AM134bus-5 worms due to the more precise GFP labelling and that both strains show a dramatic reduction in mobility following a cold shock

TABLE 1

|  | Std Dev/MoCo |
|---|---|
| AM134bus-5 | |
| Room Temperature | 0.0733964 |
| Cold Shock | 0.0967688 |
| MYO2bus-5 | |
| Room Temperature | 0.0359029 |
| Cold Shock | 0.0662668 |

Table 1 summarises the standard deviation as a percentage of the total signal. In the above Examples two strains have been used to optimise the assays, the body wall muscle expressing AM134bus-5, and the more localised MYO2bus-5 (pharyngeal expressing GFP). In order to determine which of these strains will be the most effective to use in high throughput screens, a comparison of the error generated as a proportion of the mean was calculated for each using the optimal settings (a BIN value of 1 and the images are at intervals of 1 second). The data shown in Table 1 above data suggests that the MYO2bus-5 strain produces a smaller relative error than the AM134bus-5 strain during image analysis especially when the worms are of a higher mobility. This strain was therefore used in the further studies.

Example 5 Confirmation of Optimum Temporal Separation for MYO2bus-5 C. elegans

The above protocol was repeated with MYO2bus-5 worms and a time interval between each of ten consecutive images of 140 ms, 800 ms and 1 second. This experiment was undertaken in order to confirm the optimal image separation parameter. The data from all these experiments were analyzed using various bin settings to allow determination of the optimal value for this parameter.

FIG. 11 shows a summary of results for MYO2bus-5 worms with a time interval between each of ten consecutive images of 140 ms, 800 ms and 1 second and a BIN value of 1. Mean mobility coefficients (MoCo) of the same population of adult worms under room temperature and immediately after being placed at 4° C. for one hour was calculated using a BIN value of 1. The error bars represent the standard error of mean given that n−1=9. These results confirm that a time interval of 1 s is the optimal image separation i.e. gives the biggest difference in MoCo between populations of worms of differing motilities.

FIG. 12 shows the effect of both changing the time interval between GFP time lapse images during image acquisition and the BIN value during MatLab analysis on the MoCo that is calculated in a population of MYO2bus-5 C. elegans at room temperature (high mobility) relative to the same population of worms after a cold shock at 4° C. for one hour (low mobility). The figure shows a peak in relative MoCo when images are recorded at a separation of 1 second and analysed with minimised BIN value of 1 showing that these parameters give the greatest sensitivity in detecting changes in mobility.

Conclusions

Subjecting the worms to a cold shock at 4° C. for one hour dramatically reduced their mobility and was used to mimic the effects of ageing (i.e. reduce the mobility of a population). Image acquisition settings were optimized with the identification of 1 s being the most effective image separation interval. During image analysis, no binning appeared to be the optimal option for distinguishing populations of differing mobility. Finally, MYO2bus-5 worms were selected as the strain which should be used in the assay as data generated from this strain produced a much smaller error as a percentage of the signal than the AM134bus-5 strain due to more localized GFP labeling.

Example 6 Optimisation of Plate Type and Density

The aim of a high throughput technique is to maximise the number of experiments that may be performed simultaneously. This may be achieved through the use of multi-well plates. Previous experiments showed that 12 well plates were the smallest plate format applicable to the methodology. Further experiments were undertaken to optimize the density of the worm population and the time points across the ageing process at which data should be taken. FK506, a compound known to extend the chronological lifespan of C. elegans, was used as a control to optimize the assay. 12 well plates were soaked with FK506 or DMSO control, MYO2bus-5 C. elegans which had been synchronized by bleaching, were added to each well. For the 12 well plate 10, 50, 100 and 200 eggs per well were added. When the worms reached adulthood they were topically treated with FUDR and imaged by fluorescent microscopy using the GFP filter, images were taken by time lapse with an interval of 1 s for 10 s (total 10 images) and again with an interval of 10 s for 1 min (total 6 images) for each well. MatLab analysis was conducted and a BIN value of 1 was used.

FIG. 13 shows the relative MoCo of a population of worms in a 12 well plate with wells treated with FK506 or DMSO following FUDR treatment on day 0. Approximately 100 eggs were present when the worms were synchronized. All data is expressed as a fraction of the MoCo values calculated for day 0. The error bars represent the standard error of mean whereby n−1=9 for the 1 second time lapse images and 5 for the 10 second time lapse images. FIG. 13 shows that under these conditions, as expected, the relative MoCo falls over time as the worms age and become immobile. As expected FK506 treated worms have extended chronological lifespans and thus have higher MoCo for longer.

In order to determine the optimal number of eggs per plate and best times to image the worms, the effect on FK506 treatment (relative FK506 MoCo/relative control MoCo) is plotted for the range of worm densities over the time period (0, 1, 4, 6, 11 days) tested in order to identify the optimal conditions for detecting changes in ageing. Image separation of 1 s and 10 s were also compared.

FIG. 14 shows the effect of day of measurement and of worm density on the relative effect of FK506 on the MoCo. The effect on FK506 treatment (expressed as relative FK506 MoCo/relative control MoCo) is plotted for the range of worm densities (20, 50, 100 and 200 eggs per well) and over the time period (0, 1, 4, 6, 8 days) tested in order to identify the optimal conditions for detecting changes in ageing. The data shown here suggests that using 100 eggs per well is the optimal worm density and assaying on day 0 and 4 with a 1 s image separation and days 0 and 6 with 10 s image separation would be optimal for detecting age dependant changes in MoCo.

FIG. 15 shows a comparison of the MoCo in 42 MYO2bus-5 worms mock treated with 10p1 DMSO and 51 MYO2bus-5 worms treated with FK506. FIG. 15 shows the MoCo of the two populations relative to the initial MoCo as observed on Day 0 following the FUDR treatment, images were taken at a time interval of 1 s for 10 s (total 10 images) and a BIN value of 1 was used for MatLab analysis. The error bars represent the confidence interval whereby n−1=9 and p=0.01. These results show that the FK506 treated C. elegans population has a higher mobility than mock treated worms as they age over a period of 8 days.

FIG. 16 shows a comparison of the MoCo in 42 MYO2bus-5 worms mock treated with 10p1 DMSO and 51 MYO2bus-5 worms treated with FK506. FIG. 16 shows the MoCo of the two populations relative to the initial MoCo as observed on Day 0 following the FUDR treatment, images were taken at a time interval of 10 s for 1 minute (total 6 images) and a BIN value of 1 was used for MatLab analysis. The error bars represent the confidence interval whereby n−1=5 and p=0.01. These results show that the FK506 treated C. elegans population has a higher mobility than mock treated worms as they age over a period of 8 days.

Conclusions

The data described above shows that a worm density of 100 eggs per well of a 12 well dish is the optimal for detecting changes in CLS. Assaying on day 0 and 4 with a 1 s image separation and days 0 and 6 with 10 s image separation are the optimal days to carry out reads for detecting changes in CLS.

All publications mentioned in the above specification are herein incorporated by reference in their entirety. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in biochemistry and biotechnology or related fields are intended to be within the scope of the following claims.

APPENDIX 1

Matlab Code

```
% This code thresholds a pair of images based on a user defined value, it
% then takes the thresholded black and white image and reduces the resolution by a second
% user defined value. It then outputs the difference between these two
% binned, thresholded images
clear
```

APPENDIX 1-continued

Matlab Code

```
close all
%read images
image1 = imread('1.jpg');
image2 = imread('2.jpg');
image3 = imread('3.jpg');
image4 = imread('4.jpg');
image5 = imread('5.jpg');
image6 = imread('6.jpg');
image7 = imread('7.jpg');
image8 = imread('8.jpg');
image9 = imread('9.jpg');
image10 = imread('10.jpg');
% set threshold (a value between 0 and 1) and bin number
threshold = 0.04;
BIN = 1; % i.e. to turn 4*4 cells into 1 cell, BIN = 4
% convert images to black and white
thresholded_image1 = im2bw(image1,threshold);
thresholded_image2 = im2bw(image2,threshold);
thresholded_image3 = im2bw(image3,threshold);
thresholded_image4 = im2bw(image4,threshold);
thresholded_image5 = im2bw(image5,threshold);
thresholded_image6 = im2bw(image6,threshold);
thresholded_image7 = im2bw(image7,threshold);
thresholded_image8 = im2bw(image8,threshold);
thresholded_image9 = im2bw(image9,threshold);
thresholded_image10 = im2bw(image10,threshold);
% bin the images
binned_image1 = zeros(size(image1,1)/BIN, size(image1,2)/BIN);
for i=1:size(image1,1)/BIN
    for j=1:size(image1,2)/BIN
        binned_image1(i,j) = (sum(sum(thresholded_image1(((i-1)*BIN)+1:((i-1)*BIN)+BIN, ((j-1)*BIN)+1:((j-1)*BIN)+BIN))));
    end
end
binned_image2 = zeros(size(image2,1)/BIN, size(image2,2)/BIN);
for i=1:size(image2,1)/BIN
    for j=1:size(image2,2)/BIN
        binned_image2(i,j) = (sum(sum(thresholded_image2(((i-1)*BIN)+1:((i-1)*BIN)+BIN, ((j-1)*BIN)+1:((j-1)*BIN)+BIN))));
    end
end
binned_image3 = zeros(size(image3,1)/BIN, size(image3,2)/BIN);
for i=1:size(image3,1)/BIN
    for j=1:size(image3,2)/BIN
        binned_image3(i,j) = (sum(sum(thresholded_image3(((i-1)*BIN)+1:((i-1)*BIN)+BIN, ((j-1)*BIN)+1:((j-1)*BIN)+BIN))));
    end
end
binned_image4 = zeros(size(image4,1)/BIN, size(image4,2)/BIN);
for i=1:size(image4,1)/BIN
    for j=1:size(image4,2)/BIN
        binned_image4(i,j) = (sum(sum(thresholded_image4(((i-1)*BIN)+1:((i-1)*BIN)+BIN, ((j-1)*BIN)+1:((j-1)*BIN)+BIN))));
    end
end
binned_image5 = zeros(size(image5,1)/BIN, size(image5,2)/BIN);
for i=1:size(image5,1)/BIN
    for j=1:size(image5,2)/BIN
        binned_image5(i,j) = (sum(sum(thresholded_image5(((i-1)*BIN)+1:((i-1)*BIN)+BIN, ((j-1)*BIN)+1:((j-1)*BIN)+BIN))));
    end
end
binned_image6 = zeros(size(image6,1)/BIN, size(image6,2)/BIN);
for i=1:size(image6,1)/BIN
    for j=1:size(image6,2)/BIN
        binned_image6(i,j) = (sum(sum(thresholded_image6(((i-1)*BIN)+1:((i-1)*BIN)+BIN, ((j-1)*BIN)+1:((j-1)*BIN)+BIN))));
    end
end
binned_image7 = zeros(size(image7,1)/BIN, size(image7,2)/BIN);
for i=1:size(image7,1)/BIN
    for j=1:size(image7,2)/BIN
        binned_image7(i,j) = (sum(sum(thresholded_image7(((i-1)*BIN)+1:((i-1)*BIN)+BIN, ((j-1)*BIN)+1:((j-1)*BIN)+BIN))));
    end
end
binned_image8 = zeros(size(image8,1)/BIN, size(image8,2)/BIN);
for i=1:size(image8,1)/BIN
```

APPENDIX 1-continued

Matlab Code

```
    for j=1:size(image8,2)/BIN
        binned_image8(i,j) = (sum(sum(thresholded_image8(((i-1)*BIN)+1:((i-1)*BIN)+BIN, ((j-1)*BIN)+1:((j-1)*BIN)+BIN))));
    end
end
binned_image9 = zeros(size(image9,1)/BIN, size(image9,2)/BIN);
for i=1:size(image9,1)/BIN
    for j=1:size(image9,2)/BIN
        binned_image9(i,j) = (sum(sum(thresholded_image9(((i-1)*BIN)+1:((i-1)*BIN)+BIN, ((j-1)*BIN)+1:((j-1)*BIN)+BIN))));
    end
end
binned_image10 = zeros(size(image10,1)/BIN, size(image10,2)/BIN);
for i=1:size(image10,1)/BIN
    for j=1:size(image10,2)/BIN
        binned_image10(i,j) = (sum(sum(thresholded_image10(((i-1)*BIN)+1:((i-1)*BIN)+BIN, ((j-1)*BIN)+1:((j-1)*BIN)+BIN))));
    end
end
%
% Determine difference and output images
difference_matrix_1_2 = abs(binned_image1 - binned_image2);
difference_matrix_2_3 = abs(binned_image2 - binned_image3);
difference_matrix_3_4 = abs(binned_image3 - binned_image4);
difference_matrix_4_5 = abs(binned_image4 - binned_image5);
difference_matrix_5_6 = abs(binned_image5 - binned_image6);
difference_matrix_6_7 = abs(binned_image6 - binned_image7);
difference_matrix_7_8 = abs(binned_image7 - binned_image8);
difference_matrix_8_9 = abs(binned_image8 - binned_image9);
difference_matrix_9_10 = abs(binned_image9 - binned_image10);
MoCo_1 = sum(sum((difference_matrix_1_2)))/(((sum(sum(binned_image1)))+sum(sum(binned_image2)))/2);
MoCo_2 = sum(sum((difference_matrix_2_3)))/(((sum(sum(binned_image2)))+sum(sum(binned_image3)))/2);
MoCo_3 = sum(sum((difference_matrix_3_4)))/(((sum(sum(binned_image3)))+sum(sum(binned_image4)))/2);
MoCo_4 = sum(sum((difference_matrix_4_5)))/(((sum(sum(binned_image4)))+sum(sum(binned_image5)))/2);
MoCo_5 = sum(sum((difference_matrix_5_6)))/(((sum(sum(binned_image5)))+sum(sum(binned_image6)))/2);
MoCo_6 = sum(sum((difference_matrix_6_7)))/(((sum(sum(binned_image6)))+sum(sum(binned_image7)))/2);
MoCo_7 = sum(sum((difference_matrix_7_8)))/(((sum(sum(binned_image7)))+sum(sum(binned_image8)))/2);
MoCo_8 = sum(sum((difference_matrix_8_9)))/(((sum(sum(binned_image8)))+sum(sum(binned_image9)))/2);
MoCo_9 = sum(sum((difference_matrix_9_10)))/(((sum(sum(binned_image9)))+sum(sum(binned_image10)))/2);
Average_MoCo = (MoCo_1 + MoCo_2 + MoCo_3 + MoCo_4 + MoCo_5 + MoCo_6 + MoCo_7 + MoCo_8 + MoCo_9)/9;
MoCo_StdDev = std([MoCo_1 MoCo_2 MoCo_3 MoCo_4 MoCo_5 MoCo_6 MoCo_7 MoCo_8 MoCo_9]);
imagesc(difference_matrix_1_2);figure(gcf)
disp('Average MoCo:')
disp(Average_MoCo)
disp('MoCo Standard Deviation:')
disp(MoCo_StdDev)
```

The invention claimed is:

1. A method for screening for and selecting biological compositions that have an effect upon the chronological lifespan of a population of at least 100 organisms by determining the change in the mobility of a population of organisms over time, wherein the organisms are selected from the group consisting of: *Caenorhabditis elegans* and *Danio rerio*; and wherein the organisms are labelled, said method comprising applying a biological composition to the population of organisms and:
   a) obtaining a first image (I1) of the population at a first time point (T1),
   b) obtaining a second image (I2) of the population at a second time point (T2),
   c) calculating the absolute differences between I1 and I2 (ΔD1),
   d) obtaining a third image (I3) of the population at a third time point (T3),
   e) obtaining a fourth image (I4) of the population at a fourth time point (T4),
   f) calculating the absolute differences between I3 and I4 (ΔD2), and
   g) calculating the change between ΔD1 and ΔD2 to calculate a change in the mobility of the population as a whole, and
   (h) determining whether the biological composition exhibits an effect upon the chronological lifespan of the population when compared to a population that has not been exposed to the biological composition, wherein biological compositions that extend the chronological lifespan of the population of organisms are selected.

2. The method according to claim 1, wherein the time period between I1 and I2 is about 100 ms to about 5 minutes, about 140 ms to about 3 minutes, about 200 ms to about 90 s, about 300 ms to about 1 minute, about 400 ms to about 45 s, about 500 ms to about 30 s, about 600 ms to about 15 s, about 700 ms to about 10 s, about 750 ms to about 5 s, about 800 ms to about 3 s, about 850 ms to about 2 s, about 900 ms to about 1 s, or about 1 s to about 2 s.

3. The method according to claim 1 or claim 2, wherein the time period between I2 and I3 is at least about 6 hours, at least about 12 hours, at least about 1 day, at least about 2 days, at least about 3 days, at least about 4 days, at least about 5 days, at least about 6 days, at least about 7 days, at least about 8 days, at least about 9 days, at least about 10 days, at least about 11 days or at least about 12 days.

4. The method according to claim 2, wherein the time period between I2 and I3 is at least about 4 days.

5. The method according to claim 1, wherein ΔD1 is calculated from images obtained on day 0.

6. The method according to claim 5, wherein ΔD2 is calculated from images obtained on day 4.

7. The method according to claim 2 wherein the time period between I1 and I2 is about 1 s.

8. The method according to claim 1, wherein ΔD2 is calculated from images obtained on day 6.

9. The method according to claim 1, wherein the time period between I1 and I2 is about 10 s.

10. The method according to claim 1, wherein the population comprises at least about 110, at least about 120, at least about 150, at least about 175, at least about 200, at least about 250, at least about 300, at least about 350, at least about 400, at least about 450, at least about 500, at least about 550, at least about 600, at least about 650, at least about 700, at least about 750, at least about 800, at least about 850, at least about 900, at least about 950 or at least about 1000 organisms.

11. The method according to claim 1, wherein the organisms are labelled with green fluorescent protein (GFP).

12. The method according to claim 1, wherein the label is localised to one particular area within the organisms.

13. The method according to claim 1, wherein the organisms are *Caenorhabditis elegans*, and the population of *Caenorhabditis elegans* is fluorescently labelled by any suitable fluorescent label.

14. The method according to claim 1, wherein the population is maintained in a single well or multi-well plate.

15. The method according to claim 13, wherein the organisms are drug sensitive *Caenorhabditis elegans* worms expressing green fluorescent protein (GFP), wherein the GFP expression is localised to one particular area within the labelled organisms.

16. The method of claim 1, which method is for assessing the effect of at least one test compound on the mobility of the population of the organisms, wherein the method is used in drug discovery and/or in toxicology.

17. A computer program stored on a non-transitory computer-readable medium, comprising instructions operable to configure a data processing apparatus to perform the method according to claim 1.

* * * * *